United States Patent
Leyrer et al.

(10) Patent No.: US 10,484,119 B2
(45) Date of Patent: Nov. 19, 2019

(54) OPEN REAL-TIME ETHERNET PROTOCOL

(71) Applicant: Texas Instruments Incorporated, Dallas, TX (US)

(72) Inventors: Thomas Anton Leyrer, Geisenhausen (DE); Thomas Mauer, Gammelsdorf (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/712,888

(22) Filed: Sep. 22, 2017

(65) Prior Publication Data

US 2018/0091245 A1    Mar. 29, 2018

Related U.S. Application Data

(60) Provisional application No. 62/399,060, filed on Sep. 23, 2016.

(51) Int. Cl.
| | |
|---|---|
| *H04L 12/64* | (2006.01) |
| *H04J 3/06* | (2006.01) |
| *H04L 12/861* | (2013.01) |
| *H04L 29/06* | (2006.01) |
| *H04L 12/403* | (2006.01) |
| *H04L 12/863* | (2013.01) |

(52) U.S. Cl.
CPC .......... *H04J 3/0661* (2013.01); *H04J 3/0655* (2013.01); *H04L 12/403* (2013.01); *H04L 12/64* (2013.01); *H04L 49/90* (2013.01); *H04L 69/16* (2013.01); *H04L 47/626* (2013.01)

(58) Field of Classification Search
CPC ..... H04J 3/0661; H04J 3/0655; H04L 12/403; H04L 49/90; H04L 69/16; H04L 12/64; H04L 47/626
See application file for complete search history.

(56) References Cited

U.S. PATENT DOCUMENTS

| | | | |
|---|---|---|---|
| 6,909,717 B1 * | 6/2005 | Higgins | H04L 12/64 370/394 |
| 6,988,236 B2 * | 1/2006 | Ptasinski | H04L 1/0003 714/758 |
| 2016/0252892 A1 * | 9/2016 | Valcore, Jr. | G05B 19/052 700/3 |

* cited by examiner

*Primary Examiner* — Phuc H Tran
(74) *Attorney, Agent, or Firm* — Ronald O. Neerings; Charles A. Brill; Frank D. Cimino

(57) ABSTRACT

A real-time Ethernet (RTE) protocol includes start-up frames originated by a master device for network initialization including a preamble, destination address (DA), source address (SA), a type field, and a status field including state information that indicates a current protocol state that the Ethernet network is in for the slave devices to translate for dynamically switching to one of a plurality of provided frame forwarding modes. The start-up frames include device Discovery frames at power up, Parameterization frames that distribute network parameters, and Time Synchronization frames including the master's time and unique assigned communication time slots for each slave device. After the initialization at least one data exchange frame is transmitted exclusive of SA and DA including a preamble that comprises a header that differentiates between master and slave, a type field, a status field excluding the current protocol state, and a data payload.

28 Claims, 8 Drawing Sheets

| OPERATIONAL MODE | | DISC | PARAM | SYNC | DATA | MONITOR |
|---|---|---|---|---|---|---|
| SLAVE | SEND | - / LB | - | P2P | HS | HS |
| | RECEIVE | - / LB | AF / LB | P2P | AF | - |
| | FORWARD | CT | AF | - / CT | AF | - |
| | REVERSE | AF + HR | AF | - | AF | AF |
| MASTER | SEND | HS | HS | P2P / TTS | TTS | HS |
| | RECEIVE | HR | - | P2P | HR | HR |

AF: AUTO FORWARD INCOMING FRAME TO OTHER PORT WITH FIXED FORWARDING DELAY AND RECEIVE TO HOST IF NEEDED
CT: CUT-THROUGH OF INCOMING FRAME WHERE FRAME IS MODIFIED WITH FIXED FORWARDING DELAY
LB: LOOP-BACK OF FRAME ON LAST SLAVE IN A CHAIN. STATUS CHANGE FROM CONTINUOUS TO LAST
TTS: TIME TRIGGERED SEND OF A FRAME. TIME IS PRE-CONFIGURES AND BASED ON TIME SYNC ACCURACY
P2P: PEER 2 PEER TRAFFIC FOR LINE DELAY MEASUREMENT
HR: HOST RECEIVE OF A FRAME WHICH MAY ALSO BE FORWARDED TO OTHER PORT
-: NO FRAME PROCESSED IN THIS DIRECTION

FIG. 4

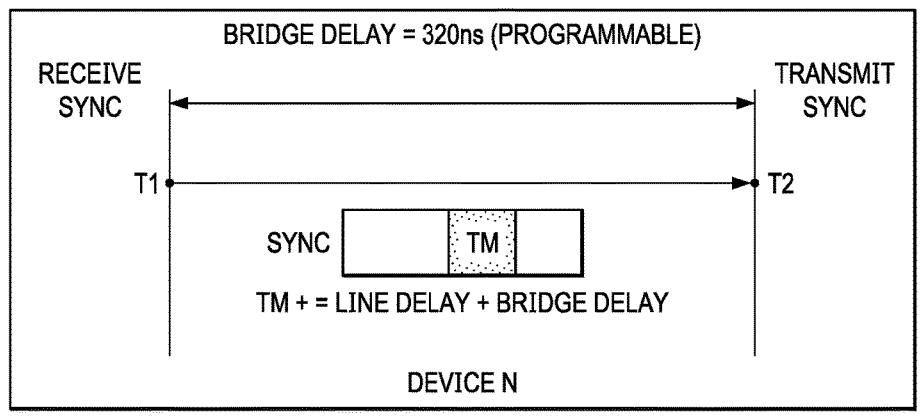

FIG. 5

OPEN REAL-TIME ETHERNET PROTOCOL

CROSS REFERENCE TO RELATED APPLICATIONS

This application claims the benefit of Provisional Application Ser. No. 62/399,060 entitled "Simple Open Real-time Ethernet (SORTE) Protocol" filed on Sep. 23, 2016, which is herein incorporated by reference in its entirety.

FIELD

Disclosed embodiments relate to real-time Ethernet protocols, Ethernet devices, and Ethernet network communications.

BACKGROUND

The Institute of Electrical and Electronics Engineers (IEEE) has provided several standards for local area networks (LANs) collectively known as IEEE 802, that include the IEEE 802.3 standard for a Carrier Sense Multiple Access/Collision Detect (CSMA/CD) protocol commonly known as the Ethernet. The Ethernet has three basic elements being a physical medium connecting stations (or client devices), an interface at each station for transceiving data across this "Ethernet channel" according to specific rules, and an Ethernet frame that comprises a standardized data format.

An Ethernet system has no central system controller. Each station (or node) shares the same physical medium (multiple access) by contending with other stations for frame transmission opportunities, which it does by 'listening' for openings on the physical medium (carrier sense) and, after starting each transmission, determining whether it is transmitting simultaneously with another station (collision detect). These functions are performed by a medium access control (MAC) sublayer, which operates as the interface between each Ethernet station and the physical medium.

This Ethernet protocol offers a number of advantages in LAN. The physical medium is simple, usually being a cable comprising a twisted pair of copper wires. The rules of CSMA/CD are simple and well known, and the hardware interface is generally inexpensive. An Ethernet network can support high data rates, with typical Ethernet networks operating at 10 base-T (10 million bits per second (Mbps)), 100 base-T (100 Mbps), or some networks at a data rate above one billion bps. Ethernet interfaces are widely available and many types of Ethernet stations can share the same physical medium, regardless of the hardware, operating system, and application software being used by each station. For these reasons, Ethernet protocol has been widely adopted for LAN implementations.

The Ethernet does have several limitations that generally renders it ineffective for real-time networking applications. For example, Ethernet does not guarantee delivery of messages, nor does it guarantee the correct message sequence for multi-frame data sequences. Where this type of functionality is desired, a transport protocol such as the transport control protocol (TCP) may be added. Even with such an additional protocol, the Ethernet is non-deterministic in the sense that delivery of any data frame cannot be guaranteed within a specific amount of time. This limitation greatly restricts the utility of Ethernet in real-time applications.

When one skilled in the art refers to industrial or real-time Ethernet, they often refer to industrial Ethernet standards including EtherCAT, PROFINET, Ethernet/IP, Sercos III or Ethernet POWERLINK. These industrial Ethernet standards support a minimum cycle time in the tens of microseconds range. The term "cycle time" for Ethernet is defined as a constant time period during which network devices (e.g., field devices such as sensors or actuators and process controllers) exchange process data, and "real-time" for Ethernet refers to an event, such as the cycle time to exchange process data occurring at a deterministic time. The particular industrial Ethernet standard dictates the minimum cycle time, where for example PROFINET IRT v2.3 which cannot have a cycle time faster than 31.25 µs due to its 64 byte frame size and this protocol requiring multiple frames for each data exchange.

Many industrial networks in factory and process automation use a cycle time between 500 µs and 10 ms to exchange process data within the network. The cycle time is chosen once during the engineering phase of the network and does not change during run time. Although PROFINET IRT v2.3 supports a cycle time as low as 31.25 µs, the majority of industrial networks in factory automation and control use cycle times greater than 500 µs, often a cycle time in the millisecond range.

SUMMARY

This Summary briefly indicates the nature and substance of this Disclosure. It is submitted with the understanding that it will not be used to interpret or limit the scope or meaning of the claims.

Some industrial automation systems (e.g., machinery applications being a special case) are recognized as being able to benefit from a control cycle time that is significantly shorter than what is currently available from known real-time Ethernet (RTE) protocols, which as described above is generally no better than about 30 µs. For one specific example, a milling or computer numerical control machine which comprises a control unit and Ethernet device controlled stepper motors (See the computer numerical control machine in FIGS. 11A and 11B described below) could improve system operations if a shorter control cycle time were available. However, such a shorter control cycle time is not provided by any known RTE protocol.

Moreover, as noted above the fastest RTE protocols support a control cycle of at best 31.25 µs, and utilize analog Ethernet signaling. Disclosed RTE protocol replaces conventional analog Ethernet signaling below a 10 µs application time with frame-based digital communications. Disclosed RTE protocol provides real-time communication and a control cycle of 4 µs (or less) for 4 or less Ethernet devices with a 100 Mbit Ethernet Physical layer.

The control cycle time provided by disclosed RTE protocol of about 4 µs or less for a 4 or less slave device network is largely enabled by (i) the slave devices dynamically switching between different frame forwarding modes according to the current protocol state that the Ethernet network is in, (ii) a significant reduction in the frame length, and (iii) a significant reduction in the interframe gap (IFG) which for a 100 Mbit Ethernet Physical layer is reduced from 960 ns to about 260 nsec. Disclosed RTE protocol is also an open protocol, so it is user modifiable unlike known industrial RTE protocols that are closed. For example, a user may generally modify the number of devices in the Ethernet network (network size), the error handling, payload size, and diagnostic data.

A disclosed RTE protocol includes start-up frames originated by the master device for network initialization including a preamble, a destination address (DA), a source address (SA), a type field and a status field including state information that indicates the current protocol state that the Ethernet network is in. Depending on the current protocol state that the Ethernet network is in, the master and slave are each in a current operational mode, such as shown in FIG. 4 described below. The slave devices translate the current protocol state indicated in the frame to dynamically switch to one of a plurality of provided operational modes for the slave and master device as a function of the frame type that reflects master and slave frame processing states including data forwarding modes (see FIG. 4 described below).

Depending on the current protocol state, the current protocol state is reflected in the contents of the start-up frame 100 shown FIG. 1A for start-up states or in the case of a data exchange state the data exchange frame 110 shown in FIG. 1B (both FIG. 1A and FIG. 1B described below). The start-up frames include device Discovery frames at power up, Parameterization frames that distribute network parameters, and Time Synchronization frames including the master's time and unique assigned communication time slots for each of the slave devices. After the initialization at least one data exchange frame is formatted then transmitted exclusive of any SA or DA enabled by the unique assigned communication time slots, including a preamble that comprises a header that differentiates between master and slave devices, a type field, a status field excluding the current protocol state, and a data payload.

BRIEF DESCRIPTION OF THE DRAWINGS

Reference will now be made to the accompanying drawings, which are not necessarily drawn to scale, wherein:

FIG. 4 shows example operational modes for the slave and master device as a function of the frame type that reflects master and slave frame processing states.

FIG. 5 shows an example bridge delay measurement.

DETAILED DESCRIPTION

Figure 1A:
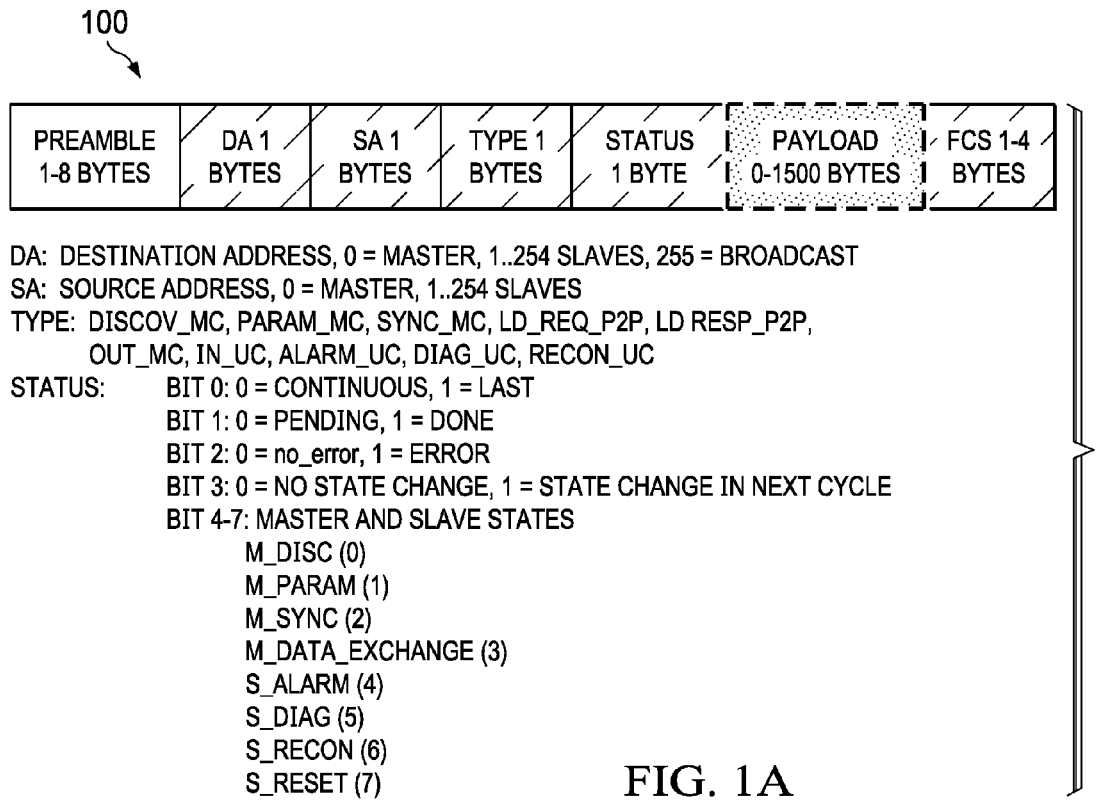
FIG. 1A shows an example frame format for a disclosed start-up frame and FIG. 1B shows an example frame format for a disclosed data exchange frame, according to example embodiments.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Disclosed RTE protocol features start-up frames for network initialization and data exchange frames. A new frame structure is disclosed that has several features believed to be unique compared to known Ethernet protocols that are listed below.

1. A reduced frame length for both start-up and data exchange frames. The reduction in frame length is particularly significant for data exchange frames which are realized by replacing the conventional SA and DA which may each be 8 bytes each by unique communication time slots for the respective slave devices assigned by the master device at start-up (as part of a disclosed Time Synchronization frame as described below) that utilize a form of Time-Division Multiplexing (TDM). Known time slots are used by the slave devices during the data exchange phase to detect the address of Ethernet frame source device node and destination device node so that during the data exchange phase there is no need for a conventional SA or DA address field.

2. A high speed Ethernet data forwarding mode (see FIG. 4 showing operational modes including frame processing including forwarding modes for the master and slave devices, where the forwarding modes include auto forward (AF), cut-through (CT), etc. is realized by using a forwarding mode dependence on the indicated current protocol state that the Ethernet network is in that is communicated by the master device during the start-up phase in the status field that includes state information which indicates a current protocol state that enables the slave devices to translate for dynamically switching to one of a list of different frame forwarding modes. A state machine (implemented in Firmware or Resistor-transistor logic (RTL)-based) may perform this translation for the slave devices and for the master device.

3. Dynamic error detection can be based on the frame length. The selection of the error code can be configured during start-up in the parameterization frame(s) and depends on the frame length and frame type.

4. For data exchange frames, a reduced frame length can be realized by replacing the conventional 32 bit frame check sum (CRC32) field with real-time monitoring and parallel storing of the error signal per data byte. Known RTE protocol standard implementations provide only error per frame or sub-frame information, while disclosed parallel monitoring of error signal per data byte provides a real-time view of the frame error. As an alternative to real-time monitoring and parallel storing of error signal per data byte, FCS can be used with only a single byte needed vs. conventional 4 bytes needed for the FCS.

Regarding disclosed RTE protocol frame format, as described above, the frame format supports dynamically switching frame forwarding modes according to current protocol state, a reduction in frame length, and the reduction in the IFG, that together significantly minimize the data processing delay and forwarding delay in the Ethernet network to provide a faster cycle time, typically as described above <4 μsec for a 4 or less slave device network. There are generally three most often used different forwarding modes utilized by network devices being AF (where the data is not modified), CT mode (where the data is modified with minimum fixed latency) and store and forward (where the data is modified with variably latency). FIG. 4 described below shows 7 processing modes including forwarding modes for the slave and master device as a function of the frame type that reflects the master and slave frame processing states as there are additional disclosed forwarding modes for data receive and data transmit. Forwarding is generally the important forwarding mode when it comes to real-time performance in a network of daisy chained Ethernet devices.

Frames which are not modified by a slave device can be forwarded using AF in the industrial communication subsystem (ICSS) of the device. In this mode the Programmable Real-Time Unit (PRU) of the device (see PRU 1021a in FIG. 10 described below) can still read the content of the frame and extract input data, or verify the content of a frame. In the CT forwarding mode an incoming frame is stored in receive first in, first out (FIFO), the device's PRU modifies the frame and then sends it to the transmit FIFO (shown as 'CT' in FIG. 4 described below). The time when content of transmit FIFO is sent to the Ethernet cable is determined by either PRU or auto forward timer. The auto forward timer can generally be programmed by a user of the Ethernet network or user of the end application in a wide range of times, such as from few nano seconds up to 5 μs in steps of 5 ns.

Figure 1B:
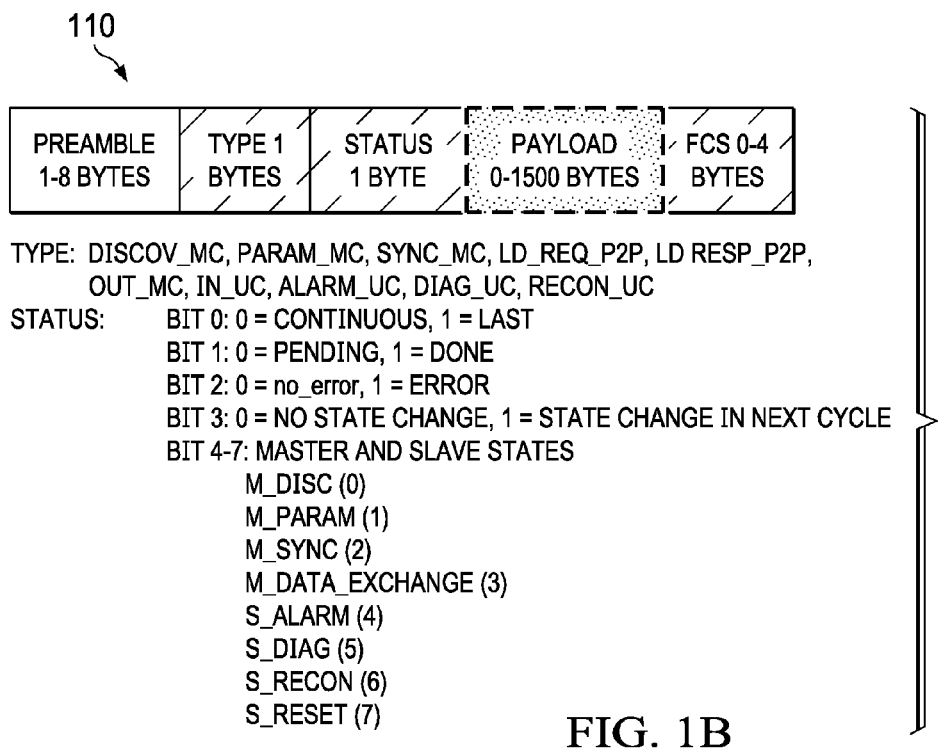

FIG. 1A shows an example frame format for a disclosed start-up frame 100 and FIG. 1B shows an example frame format for a disclosed data exchange frame 110, according to example embodiments. The start-up frame 100 is always originated by the master device, but the data exchange frame can be originated by the master device or by the slave devices. As described above the start-up frame 100 unlike data exchange frame 110 includes a DA and SA, shown as being 1 byte for both, and a DA or SA are not included in the data exchange frame 110 because as described above each slave device at start-up learned from the master at which byte location(s) it needs to read to obtain its data. For example a second slave device in the Ethernet network learns during a start-up phase using a Time Synchronization frame(s) during start-up that its data is located from byte 14 to byte 18 measured from the start of the header of the data exchange frame.

Addressing of SA and DA in the start-up frame 100 is generally limited to one byte, which for an 8 bit single byte accommodates a 254 device network with one master device. The value 255 in the DA is shown reserved for a broadcast message. The 'type' field in the start-up frame 100 and data exchange frame 110 describes the frame type which is unique for various protocol states of the RTE protocol. M_ refers to master sent, such as shown as a Discovery frame sent as M_DISC, and S_refers to slave sent, such as shown as an alarm frame sent by the slave device shown as S_ALARM.

As shown in start-up frame 100 and data exchange frame 110 there can for example be in total the 9 different frame types. The 1 byte 'status' field shown in frames 100 and 110 provides the state information for the current operation (shown in Bit 0 to Bit 3, where for example Bit 3 indicates whether there is a protocol state change in the next cycle as well as the protocol state in which the master and slave devices are currently operating in (shown in Bit 4 to Bit 7). However, the status field for the data exchange frame 110 excludes a DA and a SA.

The payload field of the start-up frame 100 can be empty for some frame types (e.g., the Synchronization frame at start-up), or go up to a maximum length of for example 1,500 bytes. Disclosed RTE device hardware generally supports frames larger than 1,500 bytes and extending the maximum size to larger frames can be defined. At the end of the start-up frame 100 there is the standard frame check-sum (FCS) field which is generally 1 to 4 bytes that can use a 32 bit Cyclic Redundancy Check (CRC) code. For shorter start-up frames the FCS can be configured to be CRC8 or CRC16. For minimum frame size and more granular error detection the RX_ERR signal from an Ethernet interface can be used instead of the FCS for error detection for start-up or for data exchange frames.

As described above, the conventional RTE protocol IFG for 100 Mbit Ethernet is 960 ns, vs. 260 ns for disclosed RTE protocol. Disclosed RTE devices generally include ICSS hardware having a programmable timer to enforce the IFG for back-to-back frames.

Figure 2:
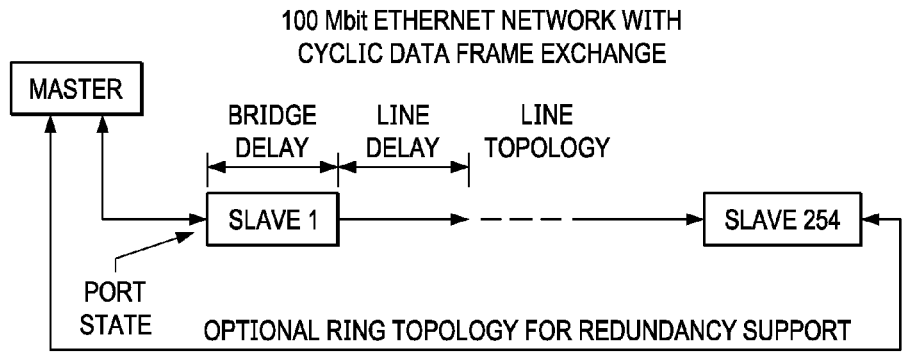
FIG. 2 depicts an example simplified 100 Mbit Ethernet network with a cyclic IP frame exchange having a master device and 254 slave devices, according to an example embodiment.

Regarding topology, disclosed RTE protocol for a single 8 bit byte supports one master device and up to 254 slave devices in the network configuration. There can be two topologies supported as shown in FIG. 2 which depicts an example 100 Mbit Ethernet network with a cyclic IP frame exchange in a network including a master device and 254 slave devices. Topology one (1) can be a line topology in which one master device sends and receives all the frames connected to the line. Topology two (2) can be a ring topology in which the master sends redundant frames on two ports which allows for one ring break without disturbing cyclic data communication. Ring mode also allows shortening the cycle time for the same amount of devices compared to the line mode.

During the start-up phase the master device explores and determines the topology and the current operating mode of the network slave devices. The operating mode can be redundant or normal if a ring topology is discovered. With a line topology only normal mode is supported. There are no multiple masters allowed in the network. The last slave device in a line topology has only one port connected. The other port of last slave device in a line remains open and cannot be used as an edge port for other Ethernet traffic.

Figure 3:
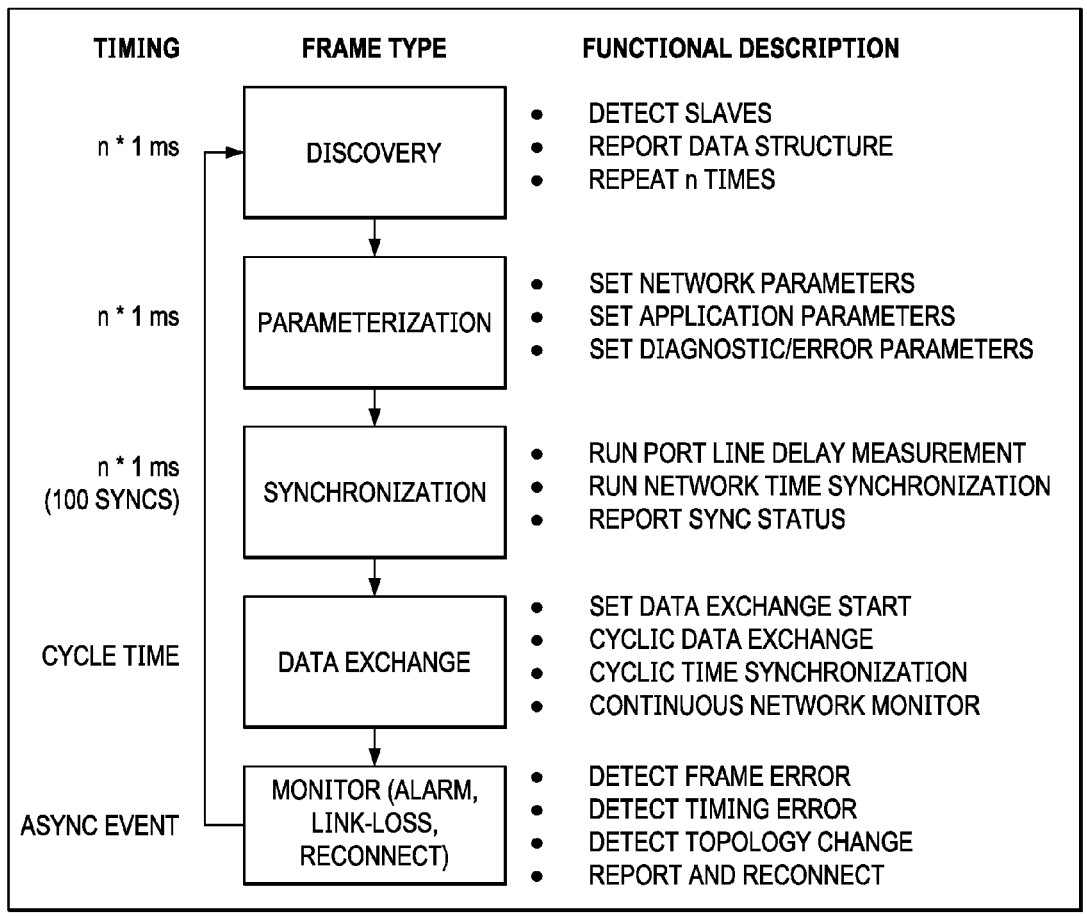
FIG. 3 shows an example timing sequence showing disclosed frame types along with their respective functional descriptions, where the various functions shown are all implementable by a state machine for a disclosed RTE protocol.

For disclosed RTE protocol as described above there is a start-up phase for initialization. After power-up during the start-up the master device initializes communications by sending a Discovery frame to the slave devices in the Ethernet network. FIG. 3 shows an example timing sequence for disclosed frame types along with their respective functional descriptions for a disclosed RTE protocol, where the various functions shown are all implementable by a state machine. As described above, each protocol state has its specific frame type or frame content. The frame type or frame content is shown by example defined by the start-up frame 100 shown in FIG. 1A (startup frames: Discovery, Parameterization, and Time Synchronization frames) and data exchange frame 110 shown in in FIG. 1B which also include Monitor frames used in case of alarm, link-loss, or reconnection that may only occur on an error once data exchange frames are sent. Each slave device increments a node counter (each slave increments by one in the byte; ordinarily in the payload) and inserts the number of input bytes and the number of output bytes in the payload field of the frame. There can be a 16 bit wide field which contains the number of input data and another 16 bit field for the number of output data bytes per slave device. As long as there is another slave device connected on the other port of a slave device the frame is forwarded with STATUS byte set to 'continuous'. Only the last slave device in the line changes the STATUS to 'last' and then returns the frame back to the master device.

The Discovery frame can be repeated n times at start-up until a stable network configuration is reached. At this time all input and output parameters of the network are known by the master device. The length of a Discovery frame may be for example about 1,030 bytes for a system which supports 254 slave devices. Assuming a maximum line (or cable) delay of 500 ns (100 m of cable*5 ns) plus a physical layer delay of 300 ns, plus a bridge delay of 320 ns, there is a total delay of 1,120 ns per device or 285.6 µs for a complete line of 255 RTE devices in one direction. The total round trip time with 255 networked devices is 571.2 µs. With an additional margin for the master device to store and compare the results of the Discovery frame a cycle time of 1 ms is configured. A typical repeat count is in the range of 10 to 100.

Discovery of the network is performed generally only once during start-up or in the case of a topology change (e.g., a device is added or removed from the Ethernet network). A topology change is reported by the network devices in case a connection to one port is lost. In this case the start-up phase is initiated by the master device. A link loss message from the slave device to the master device can trigger the restart (initialization using start-up frames) of the network.

The data exchange can be as fast as 3 ms after power up of the master device. For a more reliable start-up sequence supporting networks with more than 10 slave devices, 50 ms to 100 ms can be chosen for start-up timing. For one example of start-up, one can use 10 repeats for a Discovery frame, 10 repeats for a Parameterization frame, and 50 repeats for a Time Synchronization frame. Table 1 below shows an example Discovery frame format with its contents. "r/w" is short for read/write, e.g. the master device writes the field and slave device reads the field.

For advanced diagnostics the Ethernet physical layer of the device may report a line (or cable) quality parameter and line (or cable) break parameter. The line break parameter is typically the length of the broken cable which is included in the LINK_LOSS frame. The line quality parameter is part of diagnostic data which can be integrated into payload input data field or reported through a separate diagnostic frame. Diagnostic frames can be sent by each device in the corresponding cycle number which matches the slave number. This ensures that there is only one diagnostic frame per cycle. The maximum latency to report diagnostic data back to the master device is 254 data cycles for a 255 slave network.

FIG. 4 shows example operational modes for the slave and master device as a function of the frame type that reflects master and slave frame processing states. As shown, the operational modes include frame processing including some forwarding modes and other modes where frames are not forwarded, where HS stands for host send.

Regarding parameterization frames, after the discovery phase the master device distributes network parameters to the slave devices in the network using a Parameterization frame. The Parameterization frame can include, for example, the following information:

Data (or input/output) communication cycle time in ns (32 bit)
Cycle time of time synchronization in ns (32 bit)
Period of line delay measurements in ms (16 bit)
Burst count of line delay measurement (8 bit)
Gap time for line delay burst in ms (8 bit)
Delay forward time in ns (16 bit)
Application input time $T_1$ relative to cycle start time in ns (32 bit)
Application output time To relative to cycle start time in ns (32 bit)
Topology mode: 0=normal, 1=ring, 2 ring redundant (8 bit)
Diagnostic mode: 0=part of payload, 1=separate diagnostic frame per device.
Alarm mode: 0=no immediate network reset on alarms, 1=network reset on alarms.

| Field | Length | r/w | default | Description |
| --- | --- | --- | --- | --- |
| DA | 1 byte | w (master) r (slave) | 0xff | Broadcast message to all slaves. |
| SA | 1 byte | w (master) | 0x00 | Master is source of frame. No need to check address by slaves. |
| Type | 1 byte | w (master) r (slave) | 0x01 | 0x01 = DISCOV. Discovery frame type. Slaves check the type on receives. |
| Status | 1 byte | w (master) r/w (slave) | 0x00 | 0 = continuous, 1 = last. On continuous the slave inserts the IO parameter. On last state the slave only forwards the frame without modification. |
| Payload | 6 + 254 * 4 bytes | r/w (master) r/w (slave) | 0x00 | Word 0: CNT - counter incremented +1 by each slave also used as 32 bit pointer into data field. Word 1: read position offset used in output data exchange, updated by each slave. Word 2: 16 bit number of input data for slave 1. Word 3: 16 bit number of output data for slave 1 ... Word 509: number of inputs bytes for slave 254. Word 510: number of output bytes for slave 254. Each slave inserts its own number of input and output data using byte 0 as a 32 bit pointer to the position. |
| FCS | 4 bytes | w (master) r (slave) | CRC32 | Default Ethernet FCS |

Failing device in case parameter is not accepted by one slave.

The Parameterization frame is sent to all slave devices and is returned by the last slave device in network to the master device. The status LAST is set by the device which returns the frame. Like with Discovery frame the Parameterization frame can be sent multiple times to ensure all slave devices are ready to take the parameters. Only if all slave devices are returning the frame with status LAST the parameters configured by the master device are generally accepted. If a slave device does not accept the parameters it sets the status to FAIL. A typical repeat value for Parameterization frames for example is 1 to 10 with a cycle time of 1 ms.

Regarding the Time Synchronization frame(s) during start-up, there can be two types of operations with respect to time synchronization of the network. First, each device can run a line delay measurement to the neighbor device ports and repeat it according to parameters provided by master device. A LD_REQ (line delay request) frame does not contain any payload bytes. The device which sends out the LD_REQ frame can save the transmit time stamp of the frame as time T1. The device which receives the LD_REQ frame takes a receive time stamp T3 and prepares a LD_RESP (line delay response) frame in which the payload contains the local delay between receiving LD_REQ and transmitting LD_RESP frame. Time to T4 is taken when the LD_RESP is sent to the wire. While the frame starts transmission the local delay (T4−T3) can be inserted into the payload field. In the case where local response is pre-programmed delay the local delay can be inserted before the frame goes out on the port.

FIG. 5 depicts synchronization frame handling by slave devices. The actual time the synchronization function starts after the line delay towards the master port is measured. The master device sends out a SYNC frame with the master time (TM) which represents the time at the media-independent interface (MII) of the master device when the frame leaves the master device. The first slave device receives the Time Synchronization frame and updates the master's time (TM) with a line delay towards the master port and a local bridge delay shown by example being 320 ns. With pre-programmed bridge delay of 320 ns the TM field can updated without reading the time stamp T1 and T2 shown in FIG. 5. Subsequent slave devices perform the same update to TM field. As described above, the last slave device in the line does not update or forward the Time Synchronization frame.

After the Time Synchronization frame is processed the slave devices adjust their local time to be equal with the TM. As the hardware of master and slave devices generally run from timing obtained from oscillators the local time adjustment can be split into drift compensation, e.g. long term frequency variation over temperature, and offset compensation coming from frequency offsets of the oscillators. Using a filtered adaptation of local timer will compensate short time jitter induced from interface clock or external influences such as shock and vibration. The timer adjustment is generally performed right after the Time Synchronization frame is received by the forwarding PRU.

Near the beginning of the data exchange state the master device can send a multicast frame which contains all output data from each slave device in the network referred to herein as an Out frame on the line at a known time. This time reference in the Out frame is used by the slave devices to adjust (update) their local time. In case there is a long time drift of line delay the master time field can be appended to the Out frame and updated by the slave devices in the same way as the sync frame. The long time drift of line delay typically involves repeating line delay measurement from time to time.

Figure 6:
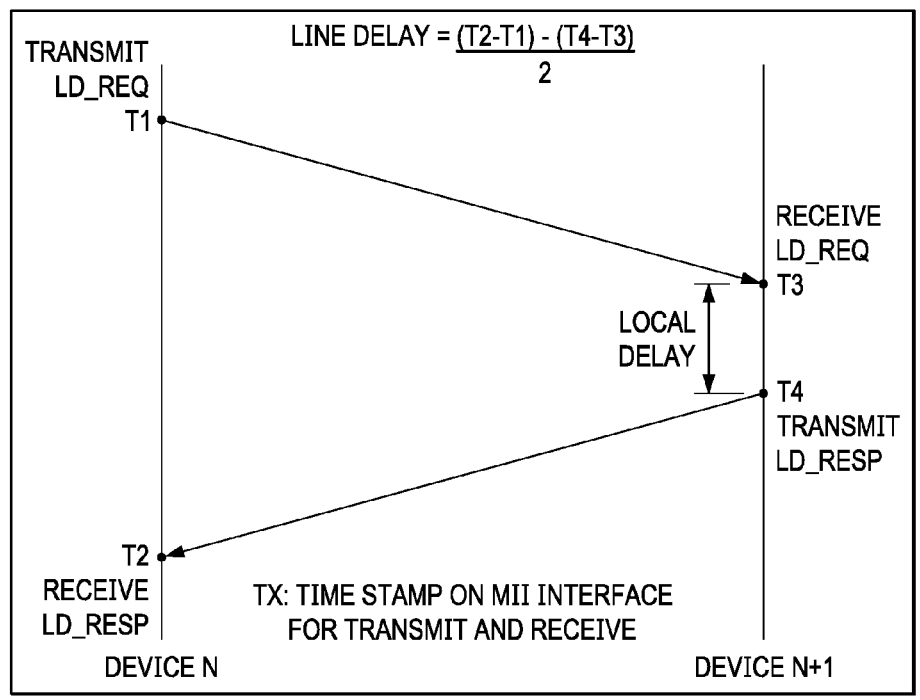
FIG. 6 shows an example line (or cable) delay measurement using timestamp values.

FIG. 6 shows an example LD measurement using time-stamp values. The sequence of LD measurements is triggered from the master device port. First the master device sends a LD_REQ to the first slave device. This triggers a line delay measurement on the other port of the slave device and so on. After the master device is done with its single line delay measurement the first slave port initiates a line delay measurement towards the master port. Same applies to other slave devices, i.e. first measurement is from master towards slaves and second measurement is from slave towards the master device. With this line delay measurement scheme every slave device knows the line delay towards master port.

Figure 7:
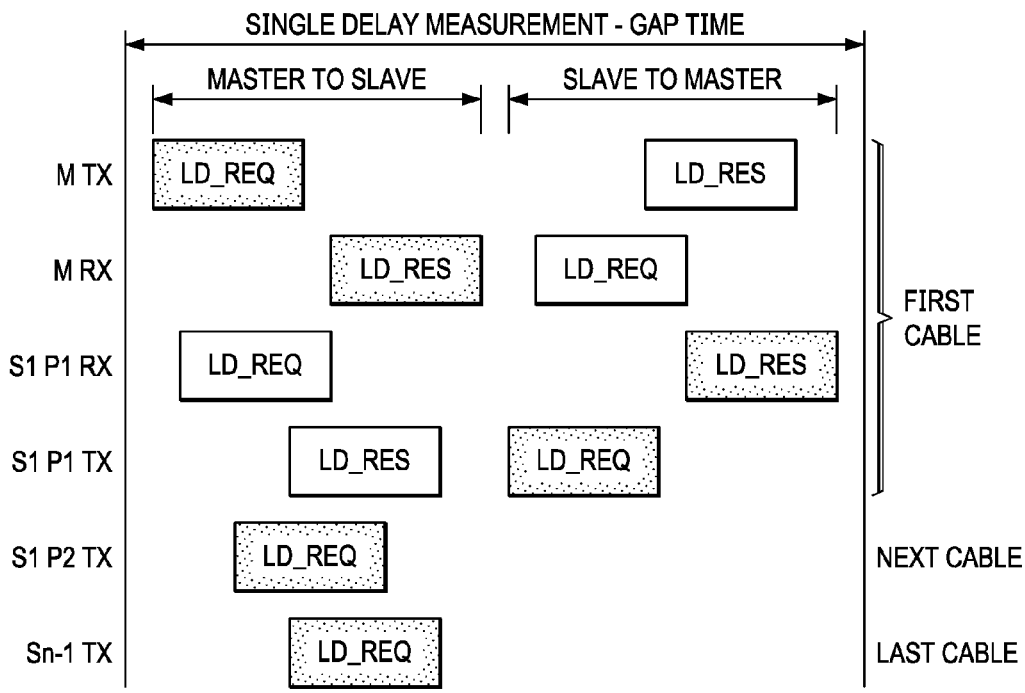
FIG. 7 shows an example line (or cable) delay measurement sequence.
Figure 8:
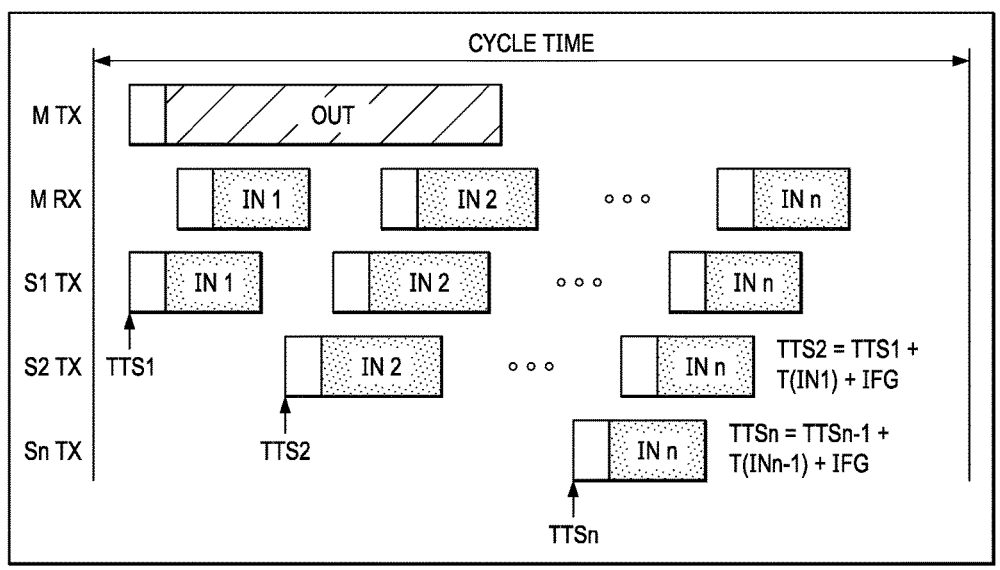
FIG. 8 shows an example data cycle principle.

FIG. 7 shows an example LD measurement sequence showing a master to slave interval and then a slave to master interval. An LD_REQ is met with an LD response (LD_Res). First cable is always master to the first device. Second and following cables are device-to-device. All LD measurements are generally needed as the cable length can be different on each connection. FIG. 8 shows an example data cycle principle. Regarding the data exchange, after the start-up phase comprising Discovery, Parameterization and Time Synchronization frames the master device and slave devices transition to a cyclic data exchange state. The state change to data exchange can be indicated in last sync frame from the master device. The last sync frame can be sent out about 10 μs before the state change to the data exchange state. In the data exchange state, the slave devices and the master devices operate in full duplex mode.

As shown in FIG. 8, in the data exchange state the first slave device S1 starts and can send its data towards the master device after 100 ns, and the master device can begin sending the multicast Out frame shown after 500 ns that comprises a single frame which contains all output data obtained from each slave device in the network. The Out data of current cycle typically depends on In data from previous cycle when implementing a closed control loop. In an open control loop the Out data is independent of the In data. The In data in this case is more like status and diagnostic data. The slave devices have variable start time for sending their In frame towards the master device. This time depends on the line delay, bridge delay and in frame size of other slaves which are between the master device and the current slave device.

The Out frame as described above is also used for time synchronization at each slave device. A difference in the time synchronization provided in the Out frame as compared to the time synchronization provided in the Time Synchronization frame is that the cycle time is not 10 μs, but the Out frame has the lower cycle time of a data exchange state (as noted above typically ≤4 μs when up to 4 slave devices are connected to the master device.

The location inside the Out frame shown for data from each slave device was provided as time slots during the discovery phase. Input data is shown sent by each slave in a separate data frame. To allow for maximum bandwidth in short cycle times, each slave device can calculate an optimum time triggered send value (TTSx) with an equation for TTSx, such as with the equation shown in FIG. 8. An error condition occurs when transmission of local in frame is not finished before sending frames from other slave devices.

Figure 9:
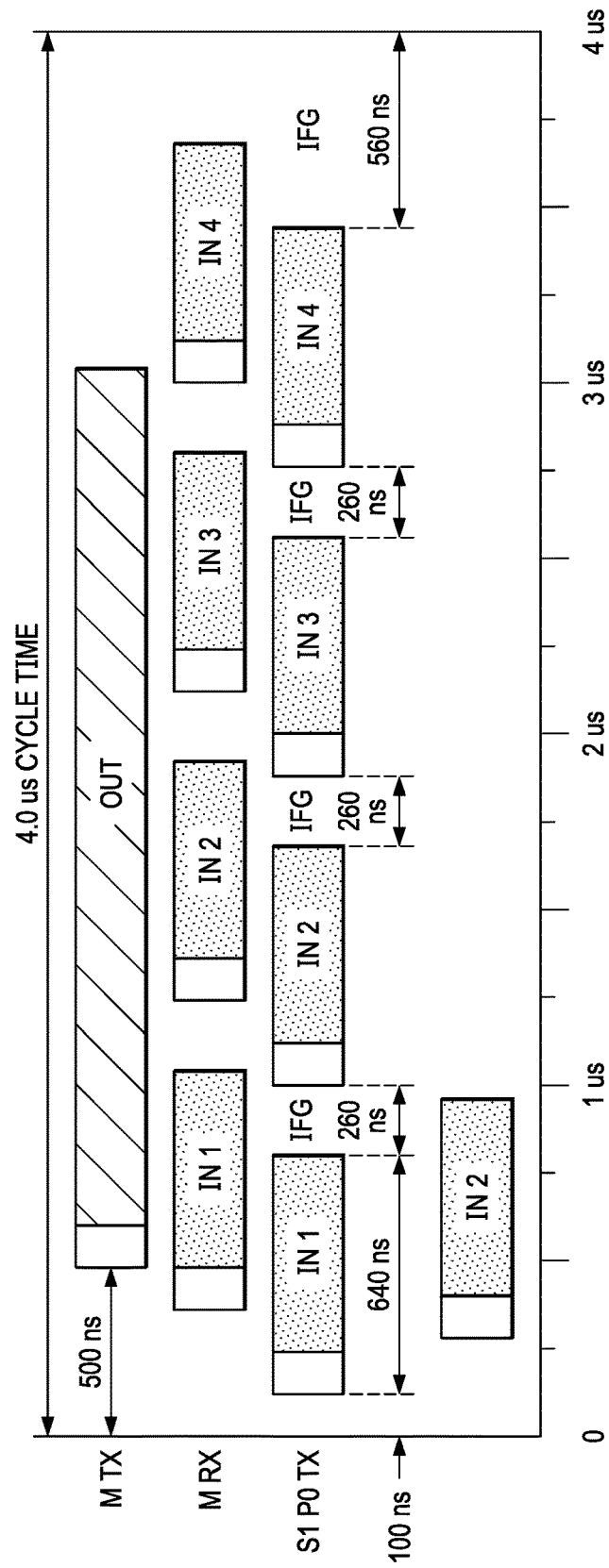
FIG. 9 provides an overview of a RTE implementation showing data transfers between master and slave devices all within a 4 μs cycle time.

FIG. 9 provides an overview of an example RTE implementation using 4 μs of cycle time for data exchange with a master device M and 4 slave devices shown as S1 to S4. The cycle time would be 255 μs for 255 slaves. Each slave device frame has 4 input bytes and 4 output bytes for data. The input and output data frame format and frame timing is configured to allow a short cycle time over the Ethernet physical layer. Shown is master transmit (M Tx) of an Out frame, master receive (M Rx) of data from slave 1 (S1) shown as In 1, In2 (from S1, data from S2), In3 (from S1, data from S3, and In 4 (from S1, data from S4) separated by an IFG of 260 ns. S2–S4 are not shown in FIG. 9 as there is no difference in timing parameters (same IFG and frame time used). An example Input (In) frame format for a data exchange frame from the slave device is shown below:

| Byte 1 | Byte 2 | Byte 3 | Byte 4 | Byte 5 | Byte 6 | Byte 7 | Byte 8 |
|---|---|---|---|---|---|---|---|
| 0xd5 | SA | STATUS | DATA1 | Data 2 | DATA3 | Data 4 | CRC8 |

An example Output (out) frame format from the master that is a broadcast frame is shown below:

| Byte 1 | Byte 2 | Byte 3 | Byte 4 | Byte 5 | ... | Byte 19 | Byte 20 |
|---|---|---|---|---|---|---|---|
| 0xd5 | SA | STATUS | DATA1 | Data 2 | ... | Data 16 | CRC8 |

The byte 8 CRC8 polynomial shown above in Byte 20 is for error and diagnostics, including alarms, Diagnostic, Reconnect, and link Loss.

Figure 10:
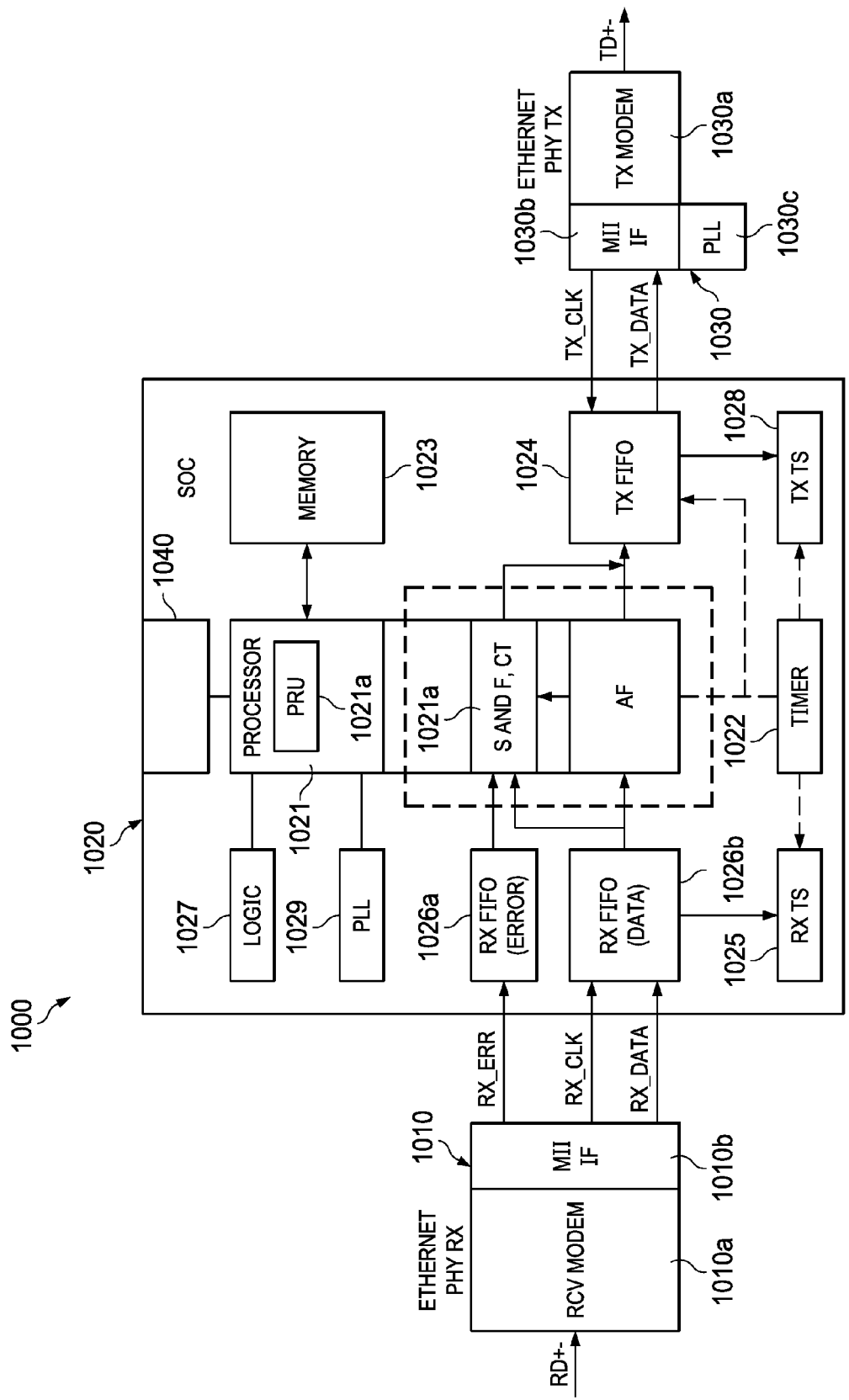
FIG. 10 is a simplified block diagram depiction of an example RTE device.

FIG. 10 shows a simplified bock diagram depiction of an example disclosed RTE device 1000 that functions as an Ethernet bridge. RTE device 1000 provides real-time monitoring and parallel storing of error signal per data byte shown as Rx FIFO (error) 1026a which is the received error signal and Rx FIFO data 1026b which is the received data. The block diagram also shows some of the disclosed data forwarding modes, store and forward (S and F), AF, and CT that are shown implemented by the processor 1021. There is shown a phase lock loop (PLL) 1029 and digital logic 1027 coupled to the processor 1021 which includes a programmable real-time unit (PRU) 1021a.

The processor 1021 functions as a central processing unit (CPU) for the RTE device 1000 which can comprise a microprocessor, digital signal processor (DSP), or a microcontroller unit (MCU). Logic block 1027 is provided in FIG. 10 to show at least some of the Ethernet bridge functions provided by RTE device 1000 can also be implemented in hardware (digital logic, e.g., resistor-transistor logic (RTL)) based being implemented in software. As known in the art RTL is a class of digital circuits built using resistors as the input network and generally bipolar junction transistors (BJTs) as the switching devices.

RTE device 1000 includes transceiver shown as an Ethernet Physical (Phy) layer Rx 1010 comprising a Rx modem 1010a, and a MII intermediate frequency (IF) block 1010b. MII IF block 1010b is shown outputting Rx_Err, Rx_Clk, and Rx_data to a data processing block 1020 including the processor 1021 shown embodied as a System on a Chip (SOC). Processor 1021 also has an associated memory 1023 and a real-time (RT) clock shown as a timer 1022. The processor 1021 with its associated memory 1023 generally implements a state machine that as described above is for the slave device translating the current protocol state that the Ethernet network is in to one of a list of different frame forwarding modes including the AF, S and F and CT forward modes shown in FIG. 10. The timer 1022 is shown incrementing the Rx time slot (Rx TS 1027) to a Tx TS 1028. The Rx modem 1010a together with the Tx modem 1030a provide a transceiver for the RTE device 1000.

Data processing block 1020 includes a Tx FIFO block 1024 that is shown receiving the auto forwarded Rx data which outputs a Tx_data signal to an Ethernet Phy Tx 1030 comprising a Tx modem 1030a, and a MII IF block 1030b that is coupled to a PLL 1030c. The MII IF block 1030b is shown providing a Tx_Clk signal to the Tx FIFO block 1024. Ethernet Phy layer Tx 1030 is shown outputting TD+− which represents a connection to next device, also referred as data signals over the cable.

The memory 1023 stores code for implementing RTE network communications including an algorithm or there is hardware including the digital logic 1027 (e.g., RTL) for implementing the algorithm. Only one of the code for implementing RTE network communications and the digital logic 1027 is generally needed to implement the algorithm.

The RTE device 1000 can be configured as a master device or a slave device. The RTE device 1000 can typically read in external configuration data through a pin header jumper or dip switch shown as a configuration block 1040 that enables selecting a master device or slave device type. The processor 1021 can then download corresponding firmware for the master or slave device into the PRU 1021a. As described above the algorithm executes a disclosed a method of RTE communications in an Ethernet network including a master device and a plurality of slave devices connected by an Ethernet connection that is generally an Ethernet cable.

A disclosed method of RTE communications generally comprises the master device formatting then transmitting start-up frames for network initialization including a preamble, DA, SA, a type field which includes a frame type selected from a plurality of frame types, and a status field including state information that indicates a current protocol state that the Ethernet network is in from a plurality of protocol states. The start-up frames include device Discovery frames at power up, parameterization frames that distribute network parameters including an IFG, and Time Synchronization frames including the TM and unique assigned communication time slots for each of the slave devices optionally with a last time synchronization frame indicating a state change. The slave devices translate the current protocol state and then dynamically switch to one of a stored list of different frame forwarding modes, such as AF, S and F, or CT. After network initialization, the master device or one of the slave devices format then initiate transmitting at least one data exchange frame exclusive of SA and DA including a preamble that comprises a header that differentiates between the master and slave devices, a type field, the status field excluding the current protocol state, and a data payload.

Error detection can be implemented using a sideband signal of a media-independent interface (MII) intermediate frequency (IF) block 1010b in FIG. 10 provided on the master and slave devices, wherein the data exchange frame excludes a FCS field. As described above, the RTE protocol is an open protocol enabling user modification in a size of the Ethernet network (more or less than 4 devices), in error handling (no FCS using RX-ERR monitoring or CRC16 for frame length of e.g. 16-32 byte frames), in payload size, or in diagnostic data. The data exchange frames can include a multicast frame (e.g., an Out frame) that provides an update for the TM for the slave devices to adjust their local time to be equal to the TM. As described above, in the configuration where the plurality of slave devices numbers 4 or less, the cycle time for the RTE protocol is ≤4 μsec. The Discovery frame can implement automatic detection and enumeration of the plurality of slave devices.

Disclosed embodiments are distinct compared with other RTE solutions in a variety of ways including because no other RTE solution exists at 100 Mbit Ethernet Physical layer to support 4 μs cycle time with one master device and 4 slave devices. Advantages of disclosed embodiments include shorter cycle time of control applications with Ethernet-based communication by replacing conventional analog signals with frame based communication in applications with <10 μs response time. Example applications include Industrial Ethernet, Motion Control, Programmable Logic Controllers (PLCs), Industrial I/O Modules, Industrial Sensors and Actuators, Servo and Stepper Drives, and Chip-to-Chip Communication Interfaces.

EXAMPLES

Disclosed embodiments are further illustrated by the following specific Examples, which should not be construed as limiting the scope or content of this Disclosure in any way.

The Table below shows a format summary for example disclosed frame states. The Frame name is also included in the frame Type (as shown 'DISC" is short for Discovery, "PARAM" is short for Parameterization, and "SYNC" is short for Time Synchronization).

Frame Format Summary

| Name | DA | SA | Type | Status | Payload | Size [bytes] |
|---|---|---|---|---|---|---|
| DISC | FF | 0 | DISC (1) | CONT DONE | cnt + reserved + (2) in_ptr + out_ptr (4) + 254 * 4 | 1026 |
| PARAM | FF | 0 | PARAM (2) | CONT DONE | LD_PERIOD (8) , LD_BURST (8) SYNC_CNT (16), CYC_TIME (32) T_IN (32), T_OUT (32) SYNC_MODE (8), LD_MODE (8) ERROR_MODE (8), DIAG_LEVEL (8), IPG (16), BD (16), TTS_IN (N * 32) RESERVED (16 bytes) | 1062 |
| LD_REQ | N-1 | N | LD_REQ (3) | LD_PENDING LD_DONE | — | 8 |
| LD_RES | N-1 | N-1 | LD_RES (4) | LD_PENDING LD_DONE | 32 bit (T4-T3), 1 ns field | 12 |
| SYNC | FF | 0 | SYNC (5) | NA | 32 bit master time TM, 1 ns field | 12 |
| OUT | FF | 0 | OUT | CONT | Dynamic | 8 + variable |
| IN | 0 | N | IN | NA | Dynamic | 8 + variable |
| RES | 0 | N | RES | RESET | N-slave number which reports error | 9 |
| ALARM | 0 | N | ALARM | ALARM | ALARM_CODE (8), ALARM_DATA (32) | 13 |
| DIAG | 0 | N | DIAG | NA | DIAG_CODE (8), DIAG_TS (32), DIAG_DATA (64) | 21 |

Figure 11A:
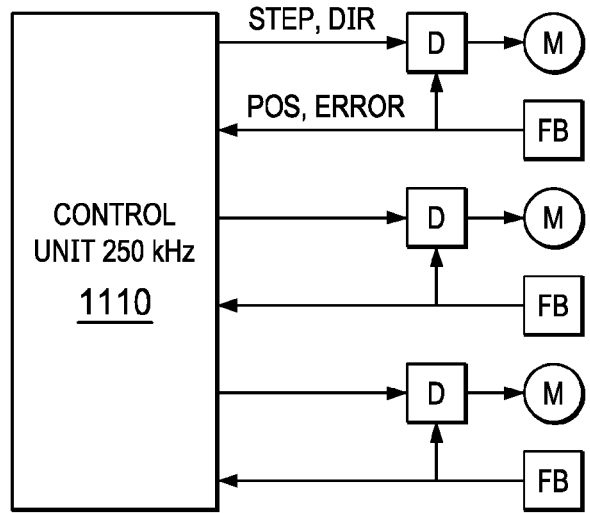
FIG. 11A and FIG. 11B show multi-axis RTE control for a computer numerical control (CNC) machine where the RTE devices shown as D are Ethernet network connected and M are the motors, with FIG. 11A showing prior art unprotected analog RTE signaling and FIG. 11B showing a new frame-based digital signaling.
Figure 11B:
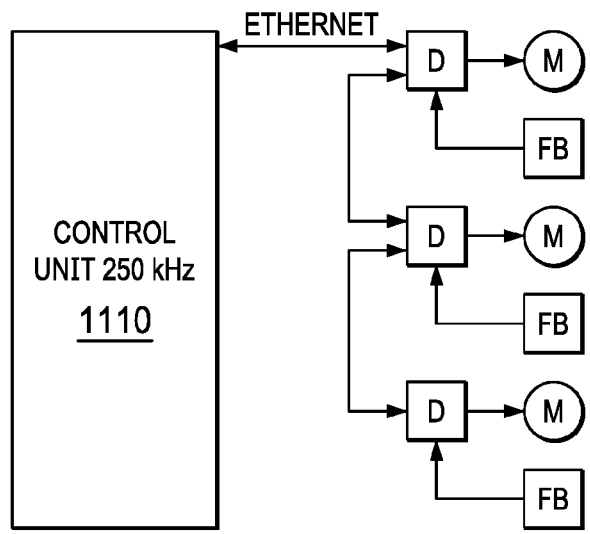

Multi-axis real-time control is now described for an example CNC machine relative to FIG. 11A which shows prior art unprotected analog signaling and FIG. 11B which shows a new frame-based digital signaling, where in FIGS. 11a and 111B the RTE devices shown as D are Ethernet connected. A control unit 1110 shown operating at 250 kHz provides control signals shown as 'step', and direction (dir) signals to Ethernet devices shown as D blocks, each associated with a motors shown as M. FB is for feedback signal sensed from the motors. In the prior art arrangement shown in FIG. 11A each D operates independently and the signals are unprotected. No error detection or error correction is applied to the signal of step and dir. A disturbance to the line can thus cause damage to the motors. In the disclosed frame-based digital signaling arrangement shown in FIG. 11B, the signals being frame-based are safer compared to analog signaling as they are digital, which also provides a higher data rate enabling more data, diagnostics, and less Ethernet cable length which enables a longer distance shown as 100 meters.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure. For example, although the Ethernet connections have been described as being wired (cable) connections, wireless Ethernet connections may also be possible, although wireless connections typically do not support different forwarding modes including CT or on the fly processing.

The invention claimed is:
1. A real-time Ethernet (RTE) device, comprising:
a transceiver;
a real-time clock;
a processor coupled to said real-time clock and to said transceiver having an associated memory which stores code for implementing start-up frames for network initialization including a preamble, destination address (DA), source address (SA), a type field which includes a frame type selected from a plurality of said frame types, and a status field including state information that indicates a current protocol state that an Ethernet network is in selected from a plurality of said protocol states for a plurality of slave devices to translate for dynamically switching to one of a list of different frame forwarding modes, said start-up frames including device Discovery frames at power up, Parameterization frames that distribute network parameters including an Inter frame Gap (IFG), and Time Synchronization frames including timing information of said master device time (TM) and unique assigned communication time slots for each of said slave devices; and for transmission after said network initialization, at least one data exchange frame exclusive of said SA and said DA that comprises a header that differentiates between said master and said slave devices, said type field, a status field excluding said current protocol state, and a data payload.

2. The RTE device of claim 1, wherein said frame forwarding modes include auto-forward (AF), cut-through (CT), loop back (LB), and time triggered send (TTS) for minimizing latency and jitter in said Ethernet network.

3. The RTE device of claim 1, wherein said data exchange frame includes a frame checksum (FCS) field.

4. The RTE device of claim 1, further including error detection implemented using a sideband signal of a media-independent interface (MII) intermediate frequency (IF) block provided on said master device and said slave devices, wherein said data exchange frame excludes a frame checksum (FCS) field.

5. The RTE device of claim 1, wherein said RTE protocol is an open protocol enabling user modification in a plurality of a size of said Ethernet network, in error handling, in payload size, and in diagnostic data.

6. The RTE device of claim 1, wherein said data exchange frame includes a multicast frame that provides an update for said TM for said slave devices to adjust their local time to be equal to said TM.

7. The RTE device of claim 1, wherein said slave devices number up to 4, and wherein a cycle time for said RTE protocol is ≤4 μsec.

8. The RTE device of claim 1, wherein said Discovery frame implements automatic detection and enumeration of each of said slave devices.

9. A method of Ethernet communications in an Ethernet network, comprising:

a master device transmitting start-up frames for network initialization including a preamble, destination address (DA), source address (SA), a type field which includes a frame type selected from a plurality of said frame types, and a status field including state information that indicates a current protocol state that said Ethernet network is in selected from a plurality of said protocol states, said start-up frames including device Discovery frames at power up, parameterization frames that distribute network parameters including an Inter frame Gap (IFG), and Time Synchronization frames including timing information of said master device (TM) and unique assigned communication time slots for each of a plurality of slave devices;

after said network initialization, said master device transmitting at least one data exchange frame exclusive of said SA and said DA that comprises a header that differentiates between said master device and said slave devices, said type field, a status field excluding said current protocol state, and a data payload.

10. The method of claim 9, further comprising during said network initialization said slave devices translating said current protocol state and then dynamically switching to one of a stored list of different frame forwarding modes.

11. The method of claim 10, wherein said slave devices include a state machine, said state machine for said translating said current protocol state.

12. The method of claim 9, wherein said time slots are used during said data exchange frames to detect an address of its Ethernet frame source and its destination.

13. The method of claim 9, wherein said frame forwarding modes include auto-forward (AF), cut-through (CT), loop back (LB), and time triggered send (TS) for minimizing latency and jitter in said Ethernet network.

14. The method of claim 9, further comprising error detection, wherein said error detection is implement using a sideband signal of a media-independent interface (MII) intermediate frequency (IF) block provided on said master device and said slave devices, wherein said data exchange frame excludes a frame checksum (FCS) field.

15. The method of claim 9, wherein said at least one data exchange frame includes a multicast frame that provides an update for said TM for said slave devices to adjust their local time to be equal to said TM.

16. The method of claim 9, further comprising providing an algorithm or hardware including digital logic for implementing said algorithm for executing said method as said master device or as said slave device, and a configuration block coupled to a processor configured for selecting between said master device and said slave device;

using said configuration block for selecting said slave device, and said slave device during said network initialization translating said current protocol state and then dynamically switching to one of a stored list of different frame forwarding modes.

17. A real-time Ethernet (RTE) device, comprising:

a transceiver;

a real-time clock;

a processor coupled to said real-time clock and to said transceiver having an associated memory which stores code for implementing real-time Ethernet (RTE) network communications in an Ethernet network including a master device and a plurality of slave devices connected by an Ethernet connection, and an algorithm or hardware including digital logic for implementing said algorithm for executing a method of Ethernet communications as said master device, said method comprising:

transmitting start-up frames for network initialization including a preamble, destination address (DA), source address (SA), a type field which includes a frame type selected from a plurality of said frame types, and a status field including state information that indicates a current protocol state that said Ethernet network is in selected from a plurality of said protocol states, said start-up frames including device Discovery frames at power up, Parameterization frames that distribute network parameters including an Inter frame Gap (IFG), and Time Synchronization frames including timing information of said master device (TM) and unique assigned communication time slots for each of said slave devices;

after said network initialization, transmitting at least one data exchange frame exclusive of said SA and said DA that comprises a header that differentiates between said master device and said slave devices, said type field, a status field excluding said current protocol state, and a data payload.

18. The RTE device of claim 17, further comprising a state machine for said translating said current protocol state to said one of a list of different frame forwarding modes.

19. The RTE device of claim 17, wherein said frame forwarding modes include auto-forward (AF), cut-through (CT), loop back (LB), and time triggered send (TTS) for minimizing latency and jitter in said Ethernet network.

20. The RTE device of claim 17, wherein said transceiver further comprises at least one independent interface (MII) intermediate frequency (IF) block configured for error detection using a sideband signal of said MII IF block, wherein said data exchange frame excludes a frame checksum (FCS) field.

21. The RTE device of claim 17, wherein said at least one data exchange frame includes a multicast frame that provides an update for said TM for said slave devices to adjust their local time to be equal to said TM.

22. The RTE device of claim 17, wherein said Discovery frame implements automatic detection and enumeration of each of said slave devices.

23. The RTE device of claim 17, wherein said algorithm is for executing said method as said master device or as said slave device, further comprising a configuration block coupled to said processor configured for selecting between said master device and said slave device, and wherein said slave devices are for during said network initialization translating said current protocol state and then dynamically switching to one of a stored list of different frame forwarding modes.

24. A real-time Ethernet (RTE) device, comprising:
a transceiver;
a real-time clock;
a processor coupled to said real-time clock and to said transceiver having an associated memory which stores code for implementing real-time Ethernet (RTE) network communications including a configuration block coupled to said processor configured for selecting between a master device or a slave device, and an algorithm or hardware including digital logic for implementing said algorithm for executing a method of Ethernet communications in an Ethernet network including said master device and a plurality of said slave devices connected by an Ethernet connection as said master device or as said slave device, said method comprising:
said master device for transmitting start-up frames for network initialization including a preamble, destination address (DA), source address (SA), a type field which includes a frame type selected from a plurality of said frame types, and a status field including state information that indicates a current protocol state that said Ethernet network is in selected from a plurality of said protocol states, said start-up frames including device Discovery frames at power up, Parameterization frames that distribute network parameters including an Inter frame Gap (IFG), and Time Synchronization frames including timing information of said master device (TM) and unique assigned communication time slots for each of said slave devices;
said slave devices for translating said current protocol state and then dynamically switching to one of a stored list of different frame forwarding modes;
after said network initialization, transmitting at least one data exchange frame exclusive of said SA and said DA that comprises a header that differentiates between said master device and slave devices, said type field, a status field excluding said current protocol state, and a data payload.

25. A real-time Ethernet (RTE) device, comprising:
a transceiver,
a real-time clock;
a processor coupled to said real-time clock and to said transceiver having an associated memory which stores code for implementing start-up frames originated by the apparatus for network initialization including a preamble, destination address (DA), source address (SA), a type field which includes a frame type selected from a plurality of said frame types, and a status field including state information that indicates a current protocol state that an Ethernet network is in selected from a plurality of said protocol states for a plurality of slave devices to translate for dynamically switching to one of a list of different frame forwarding modes, said start-up frames including device Discovery frames at power up, Parameterization frames that distribute network parameters including an Inter frame Gap (IFG), and Time Synchronization frames including timing information of said master device (TM) and unique assigned communication time slots for each of said slave devices; and
for transmission after said network initialization, at least one data exchange frame exclusive of said SA and said DA that comprises a header that differentiates between said master and said slave devices, said type field, a status field excluding said current protocol state, and a data payload.

26. A method of Ethernet communications in an Ethernet network, comprising:
a master device transmitting start-up frames for network initialization including a preamble, destination address (DA), source address (SA), a type field which includes a frame type selected from a plurality of said frame types, and a status field including state information that indicates a current protocol state that said Ethernet network is in selected from a plurality of said protocol states, said start-up frames including device Discovery frames at power up, parameterization frames that distribute network parameters including an Inter frame Gap (IFG), and Time Synchronization frames including timing information of said master device (TM) and unique assigned communication time slots for each of a plurality of slave devices;
after said network initialization, said master device transmitting at least one data exchange frame that comprises a header that differentiates between said master device and said slave devices, said type field, a status field excluding said current protocol state, and a data payload.

27. A real-time Ethernet (RTE) device, comprising:
a transceiver,
a real-time clock;
a processor coupled to said real-time clock and to said transceiver having an associated memory which stores code for implementing real-time Ethernet (RTE) network communications in an Ethernet network including a master device and a plurality of slave devices connected by an Ethernet connection, and an algorithm or hardware including digital logic for implementing said algorithm for executing a method of Ethernet communications as said master device, said method comprising:
transmitting start-up frames for network initialization including a preamble, destination address (DA), source address (SA), a type field which includes a frame type selected from a plurality of said frame types, and a status field including state information that indicates a current protocol state that said Ethernet network is in selected from a plurality of said protocol states, said start-up frames including device Discovery frames at power up, Parameterization frames that distribute network parameters including an Inter frame Gap (IFG), and Time Synchronization frames including timing information of said master device (TM) and unique assigned communication time slots for each of said slave devices;

after said network initialization, transmitting at least one data exchange frame that comprises a header that differentiates between said master device and said slave devices, said type field, a status field excluding said current protocol state, and a data payload.

28. A real-time Ethernet (RTE) device, comprising:
a transceiver;
a real-time clock;
a processor coupled to said real-time clock and to said transceiver having an associated memory which stores code for implementing real-time Ethernet (RTE) network communications including a configuration block coupled to said processor configured for selecting between a master device or a slave device, and an algorithm or hardware including digital logic for implementing said algorithm for executing a method of Ethernet communications in an Ethernet network including said master device and a plurality of said slave devices connected by an Ethernet connection as said master device or as said slave device, said method comprising:

said master device for transmitting start-up frames for network initialization including a preamble, destination address (DA), source address (SA), a type field which includes a frame type selected from a plurality of said frame types, and a status field including state information that indicates a current protocol state that said Ethernet network is in selected from a plurality of said protocol states, said start-up frames including device Discovery frames at power up, Parameterization frames that distribute network parameters including an Inter frame Gap (IFG), and Time Synchronization frames including timing information of said master device (TM) and unique assigned communication time slots for each of said slave devices;

said slave devices for translating said current protocol state and then dynamically switching to one of a stored list of different frame forwarding modes;

after said network initialization, transmitting at least one data exchange frame that comprises a header that differentiates between said master device and said slave devices, said type field, a status field excluding said current protocol state, and a data payload.

* * * * *